(12) United States Patent
Saldana, Jr.

(10) Patent No.: US 6,209,253 B1
(45) Date of Patent: Apr. 3, 2001

(54) CLOTHING MOUNTED FISHING ROD HOLDER

(76) Inventor: Daniel Saldana, Jr., 107 E. Bailey St., Cuero, TX (US) 77954-2401

( * ) Notice: Subject to any disclaimer, the term of this patent is extended or adjusted under 35 U.S.C. 154(b) by 0 days.

(21) Appl. No.: 09/244,384

(22) Filed: Feb. 4, 1999

(51) Int. Cl.[7] .............. A01K 97/10; B63C 9/08
(52) U.S. Cl. .............. 43/21.2; 441/112; 224/922; 224/251; 224/200
(58) Field of Search .............. 43/21.2; 224/200, 224/251, 922; 441/112, 116; 248/514, 520, 534, 535, 538; 2/94, 102

(56) References Cited

U.S. PATENT DOCUMENTS

| | | | | |
|---|---|---|---|---|
| 1,198,202 | * | 9/1916 | Drinkard | 224/200 |
| 1,451,732 | * | 4/1923 | Hipwood | 224/200 |
| 1,879,341 | * | 9/1932 | Lapham | 2/102 |
| 1,985,985 | * | 1/1935 | Gerline | 224/200 |
| 2,271,136 | * | 1/1942 | Geiger | 224/200 |
| 2,368,558 | * | 1/1945 | Maloney | 441/84 |
| 2,576,624 | * | 11/1951 | Miller | 224/200 |
| 2,675,143 | * | 1/1954 | Seeman, Jr. | 222/5 |
| 2,725,853 | * | 12/1955 | Nordheim | 119/789 |
| 2,878,981 | * | 3/1959 | Guido | 441/80 |
| 2,954,909 | * | 10/1960 | Miller et al. | 224/200 |
| 3,088,438 | * | 5/1963 | Oliphant | 119/770 |
| 3,282,482 | * | 11/1966 | Scharsu | 224/200 |
| 3,317,936 | * | 5/1967 | Johnson et al. | 441/84 |
| 4,011,614 | * | 3/1977 | Bell | 441/108 |
| 4,140,205 | * | 2/1979 | Matson | 182/3 |
| 4,313,236 | * | 2/1982 | Tupper et al. | 441/84 |
| 4,567,961 | * | 2/1986 | Schoenfeld | 441/112 |
| 4,802,612 | * | 2/1989 | Anderson | 224/200 |
| 4,828,152 | * | 5/1989 | Pepping | 224/200 |
| 5,127,181 | * | 7/1992 | Teixeira | 43/21.2 |
| 5,671,480 | * | 9/1997 | Krout et al. | 2/102 |
| 5,813,162 | * | 9/1998 | Tse et al. | 43/21.2 |
| 5,956,883 | * | 9/1999 | Krouth et al. | 43/21.2 |
| 6,003,746 | * | 12/1999 | Richardson | 224/200 |

FOREIGN PATENT DOCUMENTS

| | | | |
|---|---|---|---|
| 2599939 | * | 12/1987 | (FR) . |
| 2113982 | * | 8/1983 | (GB) . |
| 2123675 | * | 2/1984 | (GB) . |
| WO 95/27393 | * | 12/1987 | (WO) . |

* cited by examiner

*Primary Examiner*—Darren W. Ark

(57) ABSTRACT

A fishing pole mounting assembly is provided including an article to be worn and a mounting housing secured on the article to be worn. Also included is a position selector situated on the mounting housing and adapted to receive a handle of a fishing rod and selectively angle the same about a selected angle with respect to the horizontal.

7 Claims, 3 Drawing Sheets

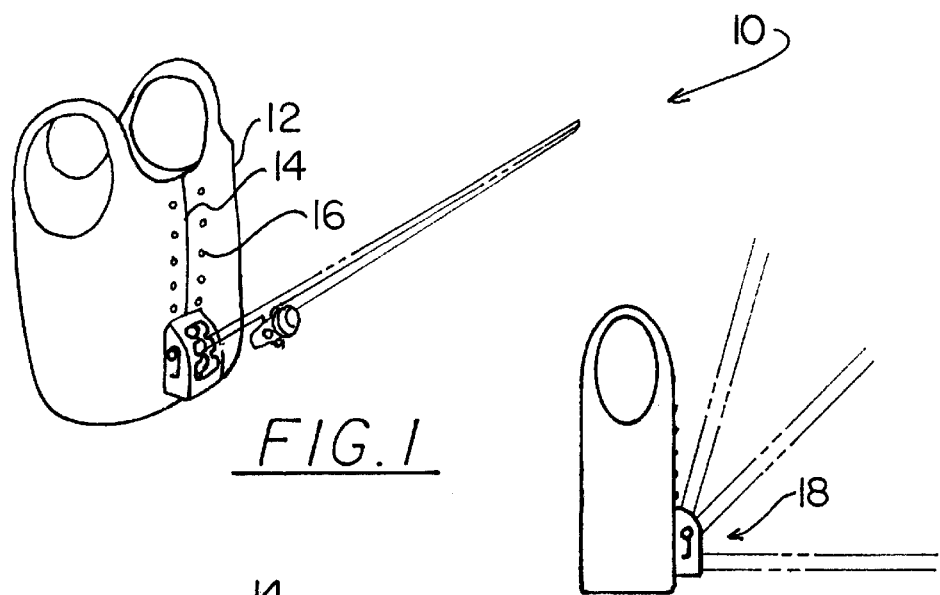
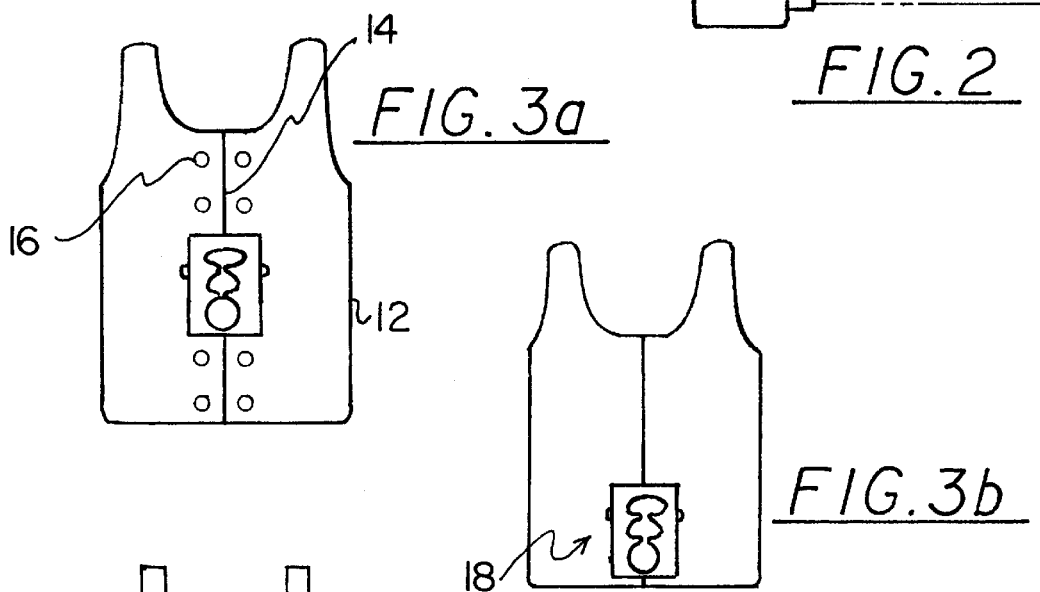
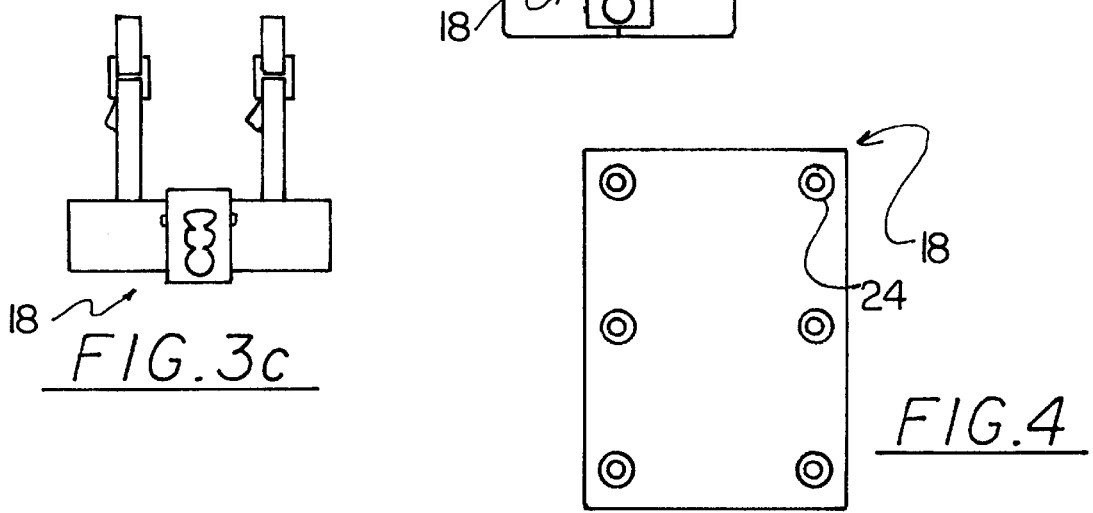

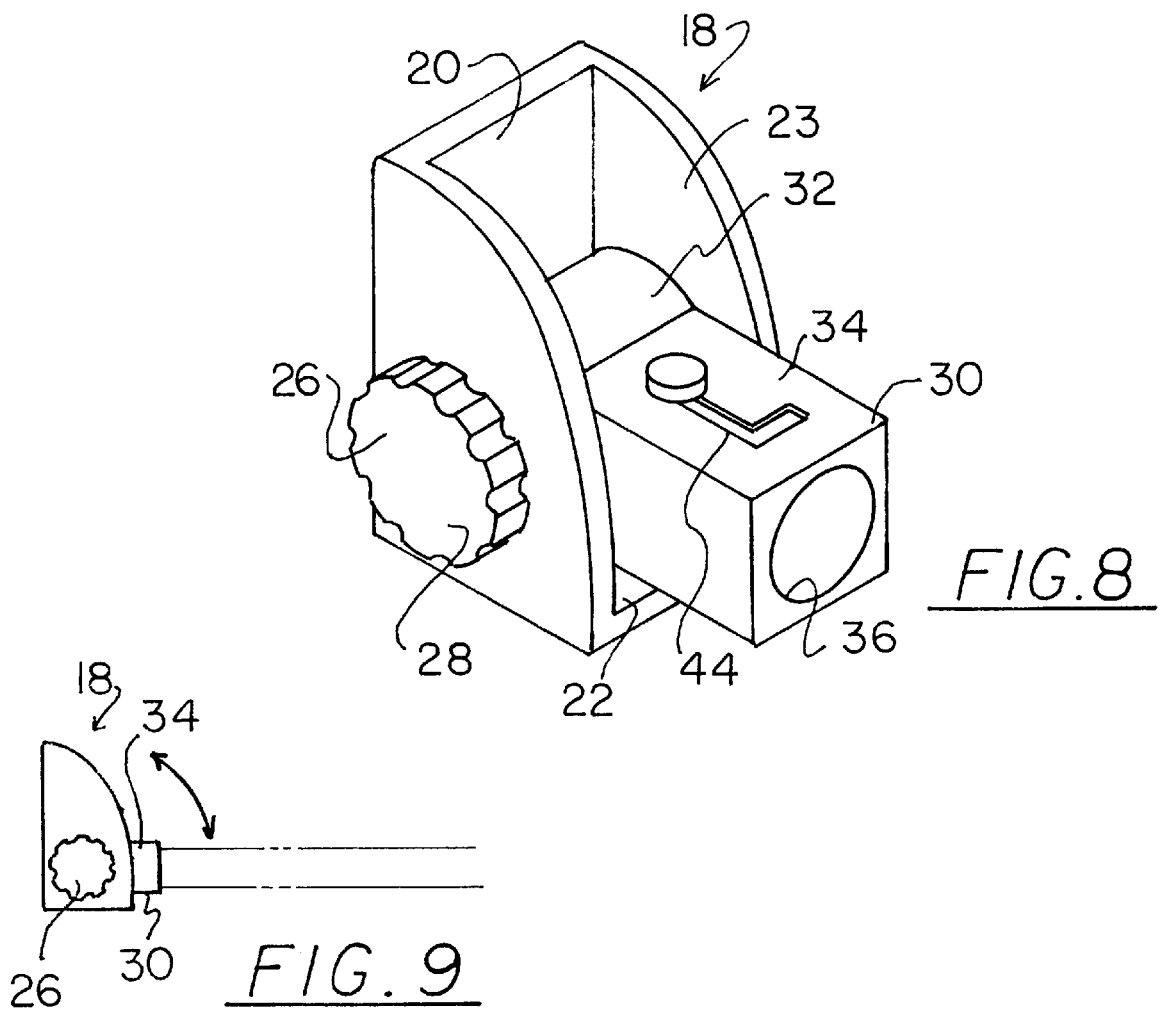
FIG. 8
FIG. 9
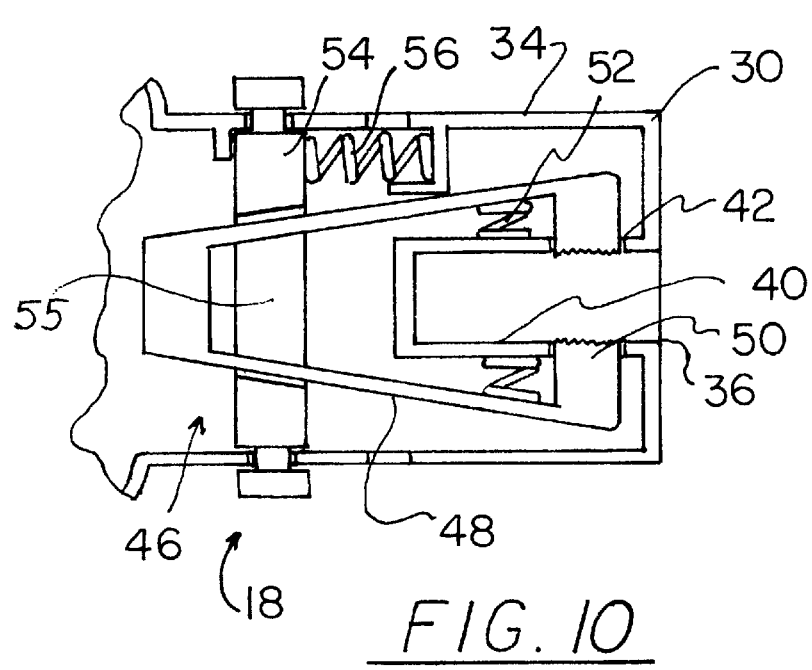
FIG. 10

CLOTHING MOUNTED FISHING ROD HOLDER

BACKGROUND OF THE INVENTION

1. Field of the Invention

The present invention relates to fishing rod holders and more particularly pertains to a new clothing mounted fishing rod holder for supporting a fishing rod on a user at a selected angle.

2. Description of the Prior Art

The use of fishing rod holders is known in the prior art. More specifically, fishing rod holders heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,802,612; U.S. Pat. No. 507,481; U.S. Pat. No. 4,817,323; U.S. Pat. No. 4,081,115; U.S. Pat. No. 2,995,855; and International applications WO 95/27393 and WO 85/02091.

In these respects, the clothing mounted fishing rod holder according to the present invention substantially departs from the conventional concepts and designs of the prior art, and in so doing provides an apparatus primarily developed for the purpose of supporting a fishing rod on a user at a selected angle.

SUMMARY OF THE INVENTION

In view of the foregoing disadvantages inherent in the known types of fishing rod holders now present in the prior art, the present invention provides a new clothing mounted fishing rod holder construction wherein the same can be utilized for supporting a fishing rod on a user at a selected angle.

The general purpose of the present invention, which will be described subsequently in greater detail, is to provide a new clothing mounted fishing rod holder apparatus and method which has many of the advantages of the fishing rod holders mentioned heretofore and many novel features that result in a new clothing mounted fishing rod holder which is not anticipated, rendered obvious, suggested, or even implied by any of the prior art fishing rod holders, either alone or in any combination thereof.

To attain this, the present invention generally comprises a floatation vest constructed from a buoyant material. As shown in FIG. 1, the floatation vest includes a tubular side wall with an open bottom, an open top, and a pair of shoulder portions mounted on the open top. A vertical is slit formed in the vest between the open top and the open bottom for allowing the vest to be removably worn. For reasons that will soon become apparent, the floatation vest further includes two columns of linearly aligned, equally spaced male snap fasteners which flank the vertical slit along an entire length between the open top and the open bottom of the vest. Also included is a mounting housing having a planar rectangular rear wall, a planar rectangular bottom wall coupled to a bottom edge of the rear wall and extending forwardly therefrom in perpendicular relationship therewith. Integrally coupled between side edges of the rear wall and the bottom wall are a pair of semicircular side walls for defining an interior space and an opening. A first one of the side walls has a smooth aperture and a second one of the side walls has a threaded aperture. For positioning the mounting housing at a selected orientation on the male fasteners of the floatation vest, the rear wall ahs a plurality of laterally spaced female snap fasteners. As shown in FIGS. 8–9, a locking bolt includes a post with a first end having a handle disk mounted thereon with an undulating periphery. A second end of the post is equipped with a plurality of threads formed therein. The post of the locking bolt is rotatably positioned within the smooth aperture and threadedly engaged with the threaded aperture. As such, rotation of the handle disk urges the side walls of the mounting housing together. Next provided is an arm including an inboard extent defined by a cylindrical sleeve with a length equal to a width of the housing. The sleeve is equipped with a central bore rotatably mounted on the locking bolt. An outboard extent of the arm has an inboard end fixedly coupled to a periphery of the sleeve of the inboard extent. The outboard extent extends beyond the side walls of the mounting housing during use. It should be noted that the outboard extent of the arm has a square cross-section along an entire length thereof to define a hollow interior. Further, an outboard end has a bore formed therein. As shown in FIG. 10, a tube is mounted to the outboard end of the outboard extent of the arm. Such tube resides within the outboard extent in coaxial relationship therewith. A pair of diametrically opposed holes are formed in the tube. A pair of L-shaped slots are each formed on top and bottom faces of the outboard extent of the arm. In use, the outboard extent of the arm may be selectively angled about a horizontal axis and locked in place by way of the locking bolt. Finally, a clamping assembly is provided including a V-shaped clip defined by a pair of linear members resiliently coupled at inboard ends thereof inside the outboard extent of the arm. Outboard ends of the linear members have inwardly extending knurled perpendicular tabs which are extendable within the diametrically opposed holes formed in the tube. A pair of coil springs are each positioned between one of the linear members and the tube for urging the perpendicular tabs out of the tube. FIG. 10 depicts a bar having a pair of ends each with an annular recess formed therein for being slidably received within the L-shaped slots of the outboard extent of the arm. A central extent of the bar serves for engaging the linear members and biasing them together upon sliding the bar outwardly along a longitudinal portion of each L-shaped slot. By this structure, a handle of a fishing rod may be positioned within the tube and clamped in a secure manner. To lock the perpendicular tabs of the linear members in engagement with the handle, the bar must be slid to an end of the longitudinal portion of each L-shaped slot and further slid within a lateral portion of each L-shaped slot.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new clothing mounted fishing rod holder apparatus and method which has many of the advantages of the fishing rod holders mentioned heretofore and many novel features that result in a new clothing mounted fishing rod holder which is not anticipated, rendered obvious, suggested, or even implied by any of the prior art fishing rod holders, either alone or in any combination thereof.

It is another object of the present invention to provide a new clothing mounted fishing rod holder which may be easily and efficiently manufactured and marketed.

It is a further object of the present invention to provide a new clothing mounted fishing rod holder which is of a durable and reliable construction.

An even further object of the present invention is to provide a new clothing mounted fishing rod holder which is susceptible of a low cost of manufacture with regard to both materials and labor, and which accordingly is then susceptible of low prices of sale to the consuming public, thereby making such clothing mounted fishing rod holder economically available to the buying public.

Still yet another object of the present invention is to provide a new clothing mounted fishing rod holder which provides in the apparatuses and methods of the prior art some of the advantages thereof, while simultaneously overcoming some of the disadvantages normally associated therewith.

Still another object of the present invention is to provide a new clothing mounted fishing rod holder for supporting a fishing rod on a user at a selected angle.

Even still another object of the present invention is to provide a new clothing mounted fishing rod holder that includes a mounting housing secured on an article to be worn. Also included is a position selector situated on the mounting housing and adapted to receive a handle of a fishing rod and selectively angle the same about a selected angle with respect to the horizontal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new clothing mounted fishing rod holder according to the present invention.

FIG. 2 is a side view of the present invention.

FIG. 3a is a front view of the present invention.

FIG. 3b is a front view of another embodiment of the present invention with the mounting housing sewn in place.

FIG. 3c is a front view of another embodiment of the present invention with the article to be worn taking the form of a belt.

FIG. 4 is a rear view of the mounting housing of the present invention.

FIG. 8 is a perspective view of another embodiment of the mounting housing and the clamping assembly of the present invention.

FIG. 9 is a side view of the embodiment shown in FIG. 8.

FIG. 10 is a top cross-sectional view of the embodiment shown in FIG. 8.

DESCRIPTION OF THE PREFERRED EMBODIMENT

Figure 5:
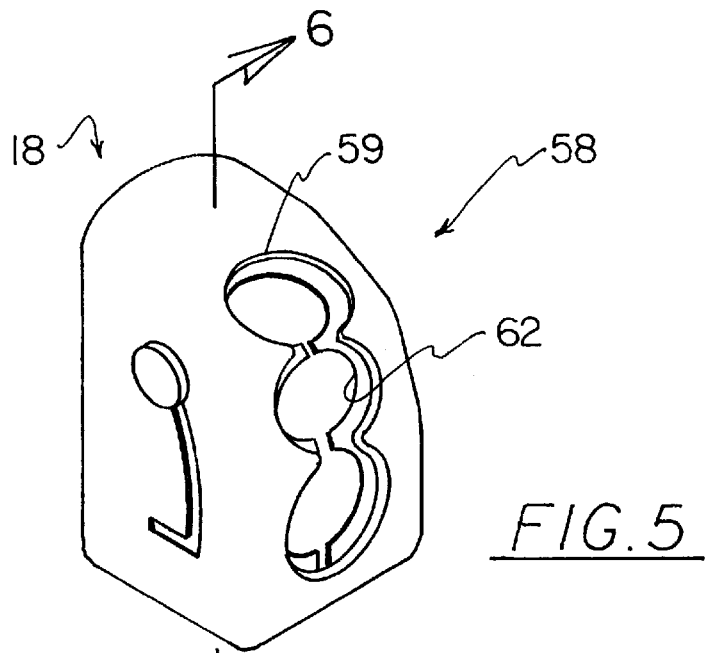
FIG. 5 is a perspective view of one embodiment of the mounting housing and clamping assembly of the present invention.

With reference now to the drawings, and in particular to FIGS. 1 through 10 thereof, a new clothing mounted fishing rod holder embodying the principles and concepts of the present invention and generally designated by the reference numeral 10 will be described.

The present invention, designated as numeral 10, includes a floatation vest 12 constructed from a buoyant material. As shown in FIG. 1, the floatation vest includes a tubular side wall with an open bottom, an open top, and a pair of shoulder portions mounted on the open top. A vertical is slit 14 formed in the vest between the open top and the open bottom for allowing the vest to be removably worn. For reasons that will soon become apparent, the floatation vest further includes two columns of linearly aligned, equally spaced male snap fasteners 16 which flank the vertical slit along an entire length between the open top and the open bottom of the vest.

Also included is a mounting housing 18 having a planar rectangular rear wall 20, a planar rectangular bottom wall 22 coupled to a bottom edge of the rear wall and extending forwardly therefrom in perpendicular relationship therewith. Integrally coupled between side edges of the rear wall and the bottom wall are a pair of semicircular side walls 23 for defining an interior space and a front upper opening. A first one of the side walls has a smooth aperture and a second one of the side walls has a threaded aperture. For positioning the mounting housing at a selected orientation on the male fasteners of the flotation vest, the rear wall has a plurality of laterally spaced female snap fasteners 24.

In the alternative, the mounting housing may be directly sewn to the vest at a lower extent thereof. Note FIG. 3b. Further, the article to be worn may take the form of a belt having a pair of shoulder straps, as shown in FIG. 3c. It should be noted that other types of worn articles may be employed such as wrist bracelets and the like.

As shown in FIGS. 8–9, a locking bolt 26 includes an unillustrated post with a first end having a handle disk 28 mounted thereon with an undulating periphery. A second end of the post is equipped with a plurality of threads formed therein. The post of the locking bolt is rotatably positioned within the smooth aperture and threadedly engaged with the threaded aperture. As such, rotation of the handle disk urges the side walls of the mounting housing together.

Next provided is an arm 30 including an inboard extent 32 defined by a cylindrical sleeve with a length equal to a width of the housing. The sleeve is equipped with a central bore rotatably mounted on the locking bolt. An outboard extent 34 of the arm has an inboard end fixedly coupled to a periphery of the sleeve of the inboard extent. The outboard extent extends beyond the side walls of the mounting housing during use. It should be noted that the outboard extent of the arm has a square cross-section along an entire length thereof to define a hollow interior. Further, an outboard end of the outboard extent has a bore 36 formed therein.

As shown in FIG. 10, a tube 40 is mounted to the outboard end of the outboard extent of the arm. Such tube resides within the outboard extent in coaxial relationship therewith. A pair of diametrically opposed holes 42 are formed in the tube. A pair of L-shaped slots 44 are each formed on top and bottom faces of the outboard extent of the arm. In use, the outboard extent of the arm may be selectively angled about a horizontal axis and locked in place by way of the locking bolt.

Finally, a clamping assembly 46 is provided including a V-shaped clip 48 defined by a pair of linear members resiliently coupled at inboard ends thereof inside the outboard extent of the arm. Ideally, the linear members are molded together at their inboard ends which are in turn attached between side faces of the outboard extent. Outboard ends of the linear members have inwardly extending knurled perpendicular tabs 50 which are extendable within the diametrically opposed holes formed in the tube. A pair of coil springs 52 are each positioned between one of the linear members and the tube for urging the perpendicular tabs out of the tube.

FIG. 10 depicts a bar 54 having a pair of ends each with an annular recess formed therein for being slidably received within the L-shaped slots of the outboard extent of the arm. A central extent 55 of the bar serves for engaging the linear members and biasing them together upon sliding the bar outwardly along a longitudinal portion of each L-shaped slot. To accomplish this, the central extent of the bar may include a pair of annular recesses or simply have a single recess of reduced diameter for flanking and constraining the linear members of the clip. For reasons that will soon become apparent, a depth of the aforementioned recesses is sufficient to allow some movement of the linear members in and out of the recesses while still remaining in engagement. By this structure, a handle of a fishing rod may be positioned within the tube and clamped in a secure manner. To lock the perpendicular tabs of the linear members in engagement with the handle, the bar must be slid to an end of the longitudinal portion of each L-shaped slot and further slid within a lateral portion of each L-shaped slot. In the preferred embodiment, a spring 56 is positioned in abutment with the bar for urging the same to an end of the L-shaped slot opposite the lateral portion.

Figure 6:
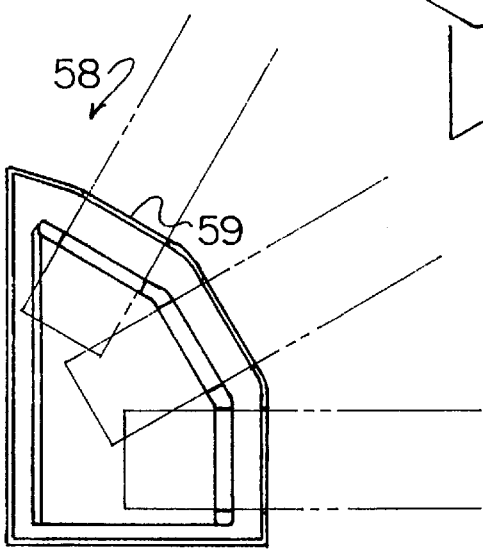
FIG. 6 is a cross-sectional view of the embodiment of FIG. 5 taken along line 6—6 shown in FIG. 5.
Figure 7:
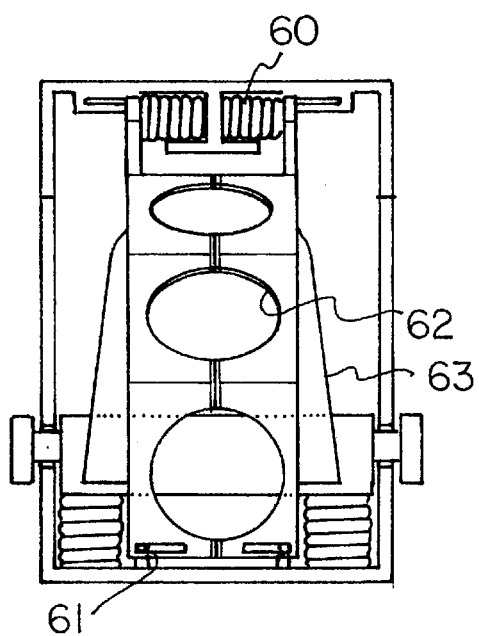
FIG. 7 is a front cross-sectional view of the embodiment of the present invention shown in FIG. 5.

In an alternate embodiment 58 shown in FIGS. 5–7, the locking post and arm are excluded in favor of a discrete position selector which includes a plurality of vertically aligned circular bores 59 formed in an arcuate front face of the mounting housing. the bores are preferably positioned in 15 or 30 degree intervals. The clamping assembly of the present embodiment preferably works under the same principles as the previous embodiment with the exception of the position of springs 60, slot and groove combination 61, and cut outs 62, as shown in FIG. 7. The bar ideally accepts wings 63 extending from members of the clamp. In the present embodiment, the handle of the fishing rod is positioned within one of the bore and clamped therein at a selected discrete angle.

As to a further discussion of the manner of usage and operation of the present invention, the same should be apparent from the above description. Accordingly, no further discussion elating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing pole mounting assembly comprising:
   an article to be worn;
   a mounting housing secured on the article to be worn;
   a position selector on the mounting housing for receiving a handle of a fishing rod and selectively angling the rod at a selected angle with respect to the horizontal; and
   wherein the article to be worn includes a flotation vest.

2. A fishing pole mounting assembly as set forth in claim 1 wherein the mounting assembly is removably secured on the article to be worn.

3. A fishing pole mounting assembly as set forth in claim 1 wherein the mounting assembly is removably secured at any one of a plurality of locations on the article to be worn.

4. A fishing pole mounting assembly as set forth in claim 3 wherein the article to be worn includes a plurality of vertically aligned fasteners for securing to the mounting assembly.

5. A fishing pole mounting assembly as set forth in claim 1 wherein the position selector is angled continuously to any desired angle.

6. A fishing pole mounting assembly as set forth in claim 1 and further including a clamping assembly for selectively securing the handle within the position selector.

7. A fishing pole mounting assembly comprising, in combination:
   a floatation vest constructed from a buoyant material and including a tubular side wall with an open bottom, an open top, a pair of shoulder portions mounted on the open top and a vertical slit formed in the vest such that the vertical slit extends from the open top to the open bottom for allowing the vest to be removably worn, the floatation vest further including two columns of linearly aligned, equally spaced male snap fasteners which flank the vertical slit along an entire length between the open top and the open bottom of the vest;

a mounting housing including a planar rectangular rear wall, a planar rectangular bottom wall coupled to a bottom edge of the rear wall and extending forwardly therefrom in perpendicular relationship therewith, and a pair of semicircular side walls integrally coupled between side edges of the rear wall and the bottom wall for defining an interior space and an opening, a first one of the side walls having a smooth aperture and a second one of the side walls having a threaded aperture, wherein the rear wall has a pair of laterally spaced female snap fasteners for coupling with the male fasteners of the flotation vest;

a locking bolt including a post with a first end having a handle disk mounted thereon with an undulate periphery and a second end with a plurality of threads formed thereon, wherein the post of the locking bolt is rotatably positioned within the smooth aperture and threadedly engaged with the threaded aperture such that rotation of the handle disk urges the side walls of the mounting housing together;

an arm including an inboard extent defined by a cylindrical sleeve with a length equal to a width of the housing and a central bore rotatably mounted on the locking bolt and an outboard extent having an inboard end fixedly coupled to a periphery of the sleeve of the inboard extent and extending beyond the side walls of the mounting housing, wherein the outboard extent of the arm has a square cross-section along an entire length thereof to define a hollow interior, an outboard end with a bore formed therein, a tube mounted to the outboard end of the outboard extent of the arm and residing therein in coaxial relationship therewith with a pair of diametrically opposed holes formed therein, and a pair of L-shaped slots each formed on top and bottom faces of the outboard extent of the arm, wherein the outboard extent of the arm may be selectively angled about a horizontal axis and locked in place by way of the locking bolt; and a clamping assembly including a V-shaped clip defined by a pair of linear members resiliently coupled at inboard ends thereof inside the outboard extent of the arm and having outboard ends with inwardly extending knurled perpendicular tabs which are extendable within the diametrically opposed holes formed in the tube, a pair of coil springs each positioned between one of the linear members and the tube for urging the perpendicular tabs out of the tube, a bar having a pair of ends each with an annular recess formed therein for being slidably received within the L-shaped slots of the outboard extent of the arm and a central extent for engaging the linear members and biasing them together upon sliding the bar outwardly along a longitudinal portion of each L-shaped slot to thereby clamp a handle of a fishing rod within the tube and further allowing the locking of the perpendicular tabs of the linear members in engagement with the handle upon the sliding of the ends of the bar within a lateral portion of each L-shaped slot.

* * * * *